Figure 1:
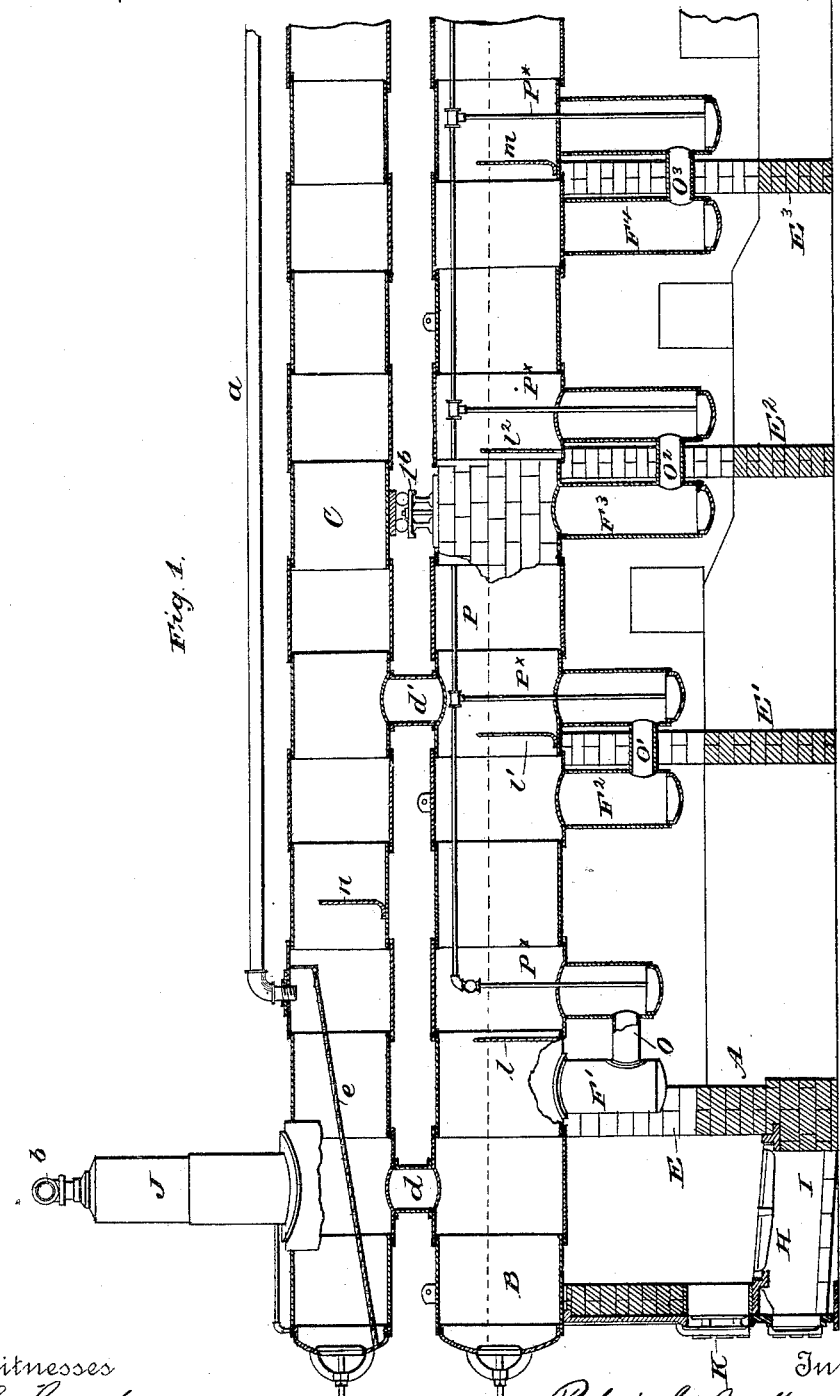

(No Model.)

7 Sheets—Sheet 1.

P. J. McMAHON.
APPARATUS FOR MAKING ANHYDROUS AMMONIA.

No. 445,331. Patented Jan. 27, 1891.

(No Model.) 7 Sheets—Sheet 2.

P. J. McMAHON.
APPARATUS FOR MAKING ANHYDROUS AMMONIA.

No. 445,331. Patented Jan. 27, 1891.

Witnesses
L. C. Hills
E. H. Bond

Inventor
Patrick J. McMahon
E. B. Stocking
Attorney

THE NORRIS PETERS CO., PHOTO-LITHO., WASHINGTON, D. C.

(No Model.) 7 Sheets—Sheet 3.
P. J. McMAHON.
APPARATUS FOR MAKING ANHYDROUS AMMONIA.
No. 445,331. Patented Jan. 27, 1891.
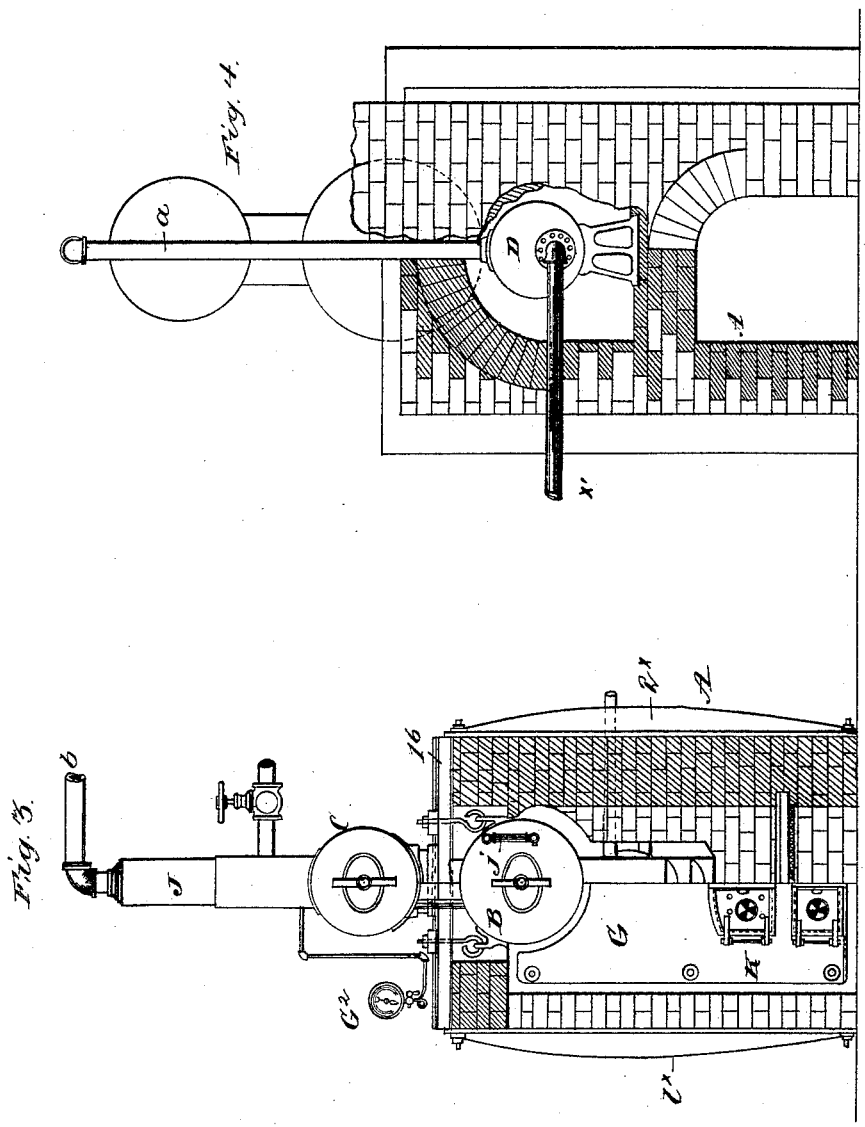
Witnesses
L. C. Hills.
E. H. Bond
Inventor
Patrick J. McMahon
E. B. Stocking
Attorney (No Model.) 7 Sheets—Sheet 4.

P. J. McMAHON.
APPARATUS FOR MAKING ANHYDROUS AMMONIA.

No. 445,331. Patented Jan. 27, 1891.

Witnesses
L. C. Hills
E. H. Bond

Inventor
Patrick J. McMahon
E. B. Stocking
Attorney

THE NORRIS PETERS CO., PHOTO-LITHO., WASHINGTON, D. C.

(No Model.) 7 Sheets—Sheet 5.
P. J. McMAHON.
APPARATUS FOR MAKING ANHYDROUS AMMONIA.
No. 445,331. Patented Jan. 27, 1891.
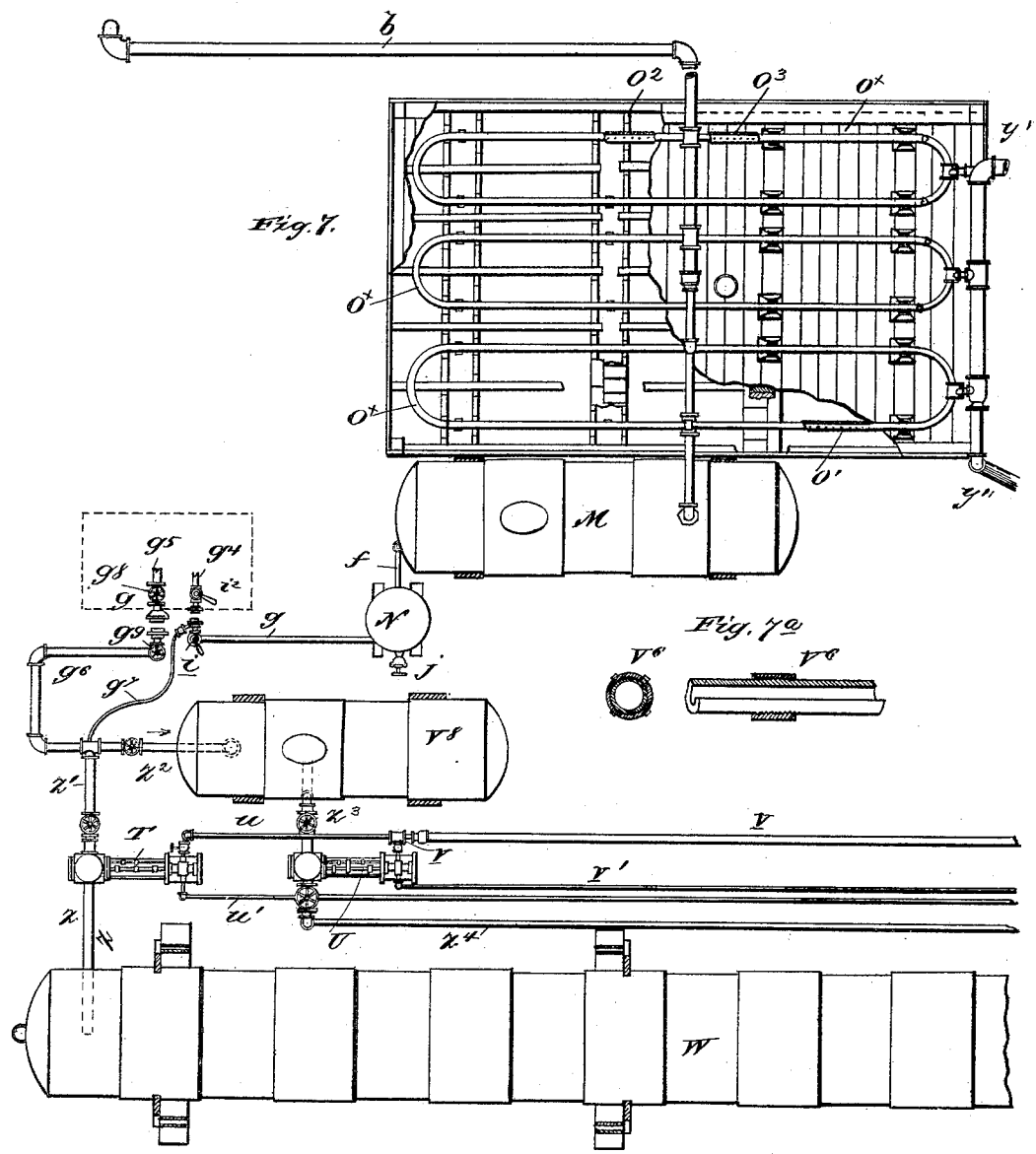
Witnesses
L. C. Hills
E. H. Bond
Inventor
Patrick J. McMahon
E. B. Stocking
Attorney

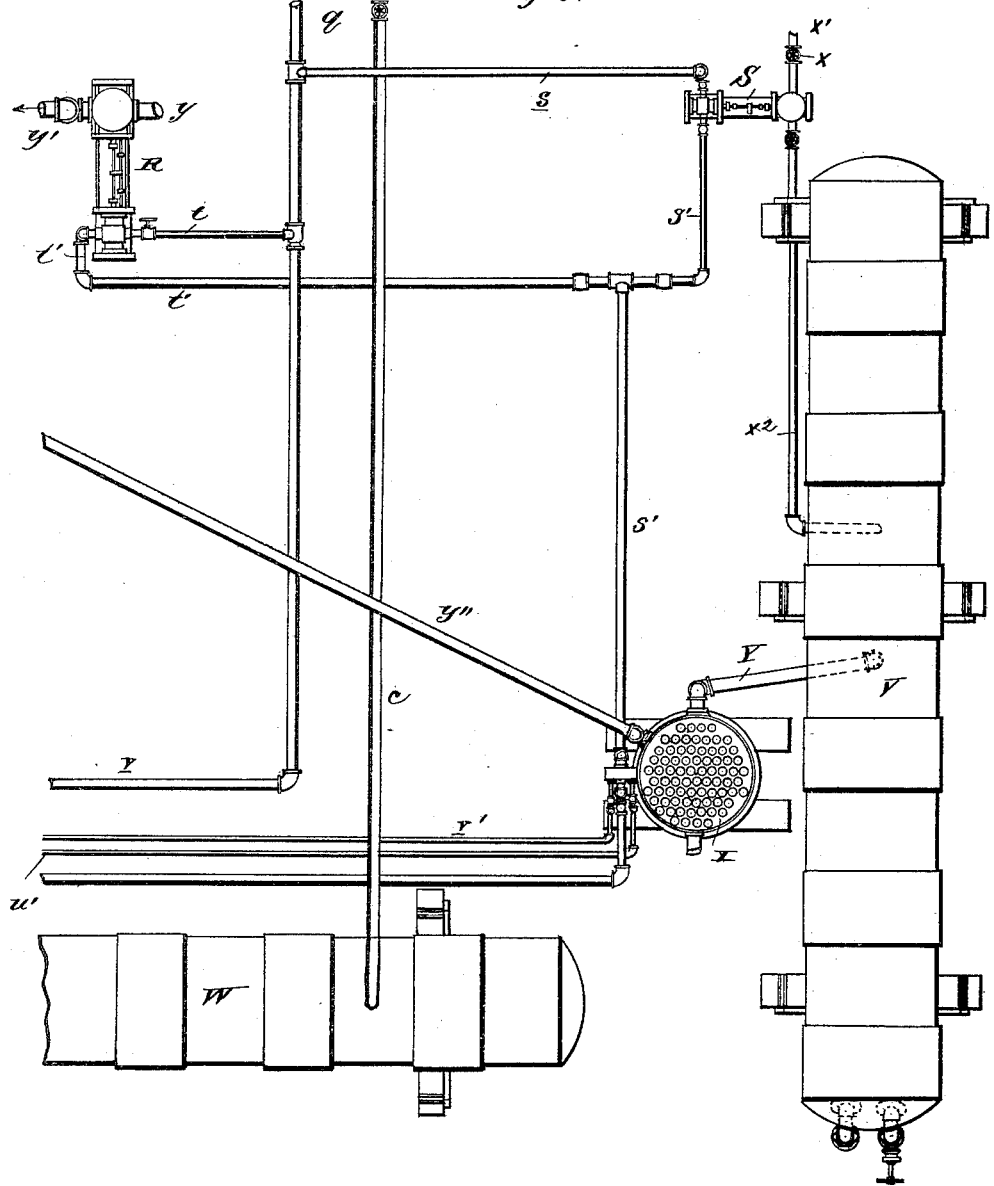

(No Model.) 7 Sheets—Sheet 7.
P. J. McMAHON.
APPARATUS FOR MAKING ANHYDROUS AMMONIA.
No. 445,331. Patented Jan. 27, 1891.
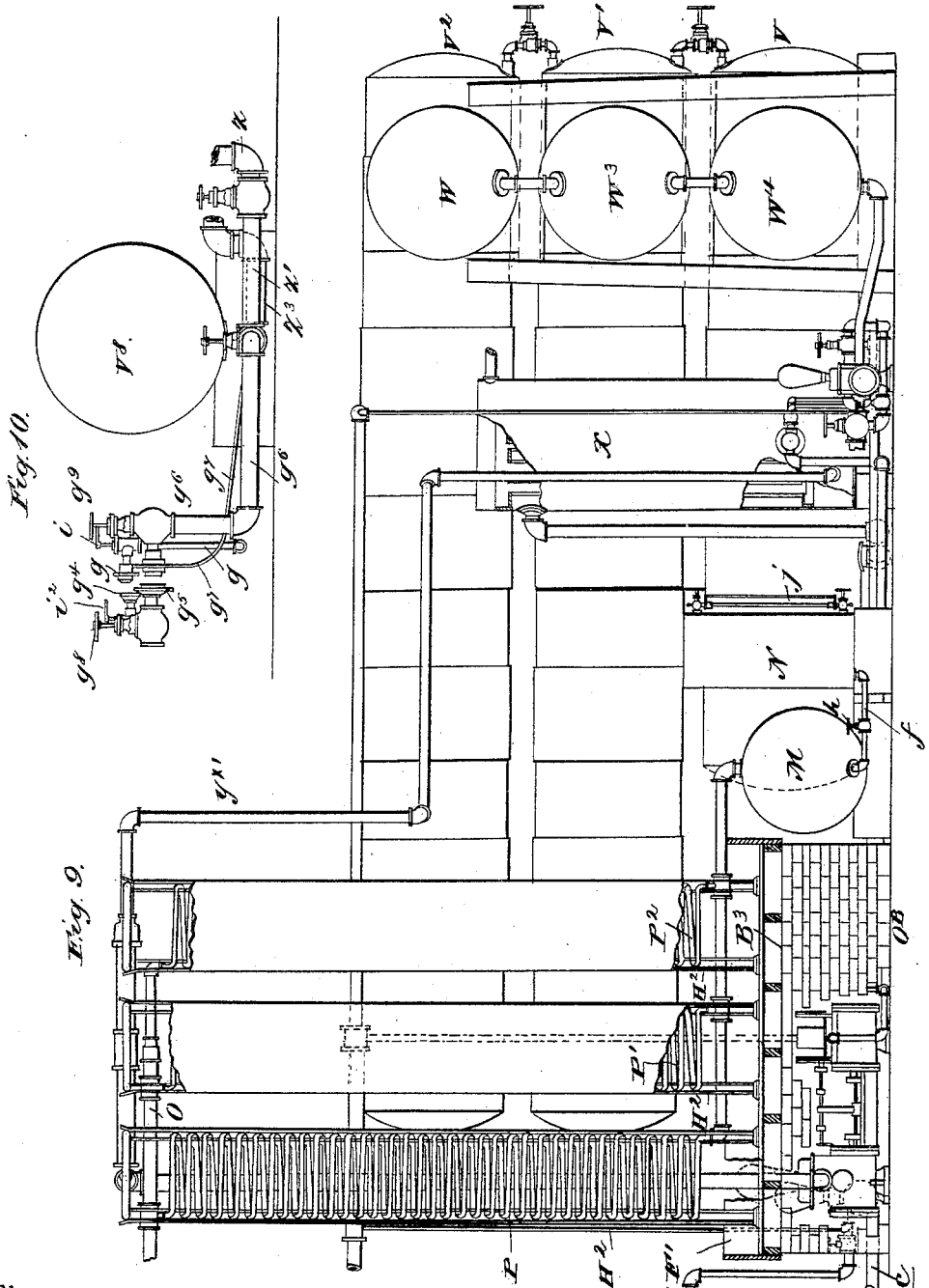
Witnesses
L. C. Hills
E. A. Bond
Inventor
Patrick J. McMahon
E. B. Stocking
Attorney

UNITED STATES PATENT OFFICE.

PATRICK JAY McMAHON, OF NEW ORLEANS, LOUISIANA.

APPARATUS FOR MAKING ANHYDROUS AMMONIA.

SPECIFICATION forming part of Letters Patent No. 445,331, dated January 27, 1891.

Application filed November 18, 1889. Serial No. 330,714. (No model.)

*To all whom it may concern:*

Be it known that I, PATRICK JAY MCMAHON, a citizen of the United States, residing at New Orleans, in the parish of Orleans, State of Louisiana, have invented certain new and useful Improvements in Apparatus for and Process of Producing Anhydrous Ammonia, of which the following is a specification, reference being had therein to the accompanying drawings.

This invention relates to certain new and useful improvements in apparatus for and process of producing anhydrous ammonia.

In all ammonia-stills heretofore in use for separating ammonia-gas from the aqueous solution and reducing it to a separate liquid (anhydrous ammonia) where the absorption system is employed in producing this liquid for ice-making, for refrigerating buildings, cars, ships, &c., for motive power and for other purposes, the still used has considerable vertical height, the height being several times the diameter, the liquid (aqua-ammonia) occupying the lower half, while the upper half constitutes the gas-room. The aqua-ammonia is heated by steam admitted into and through a coil immersed in and surrounded by the aqua-ammonia, or through vertical pipes screwed into a tube-sheet at the bottom, the lower end communicating with a steam-chamber and the upper end of each tube being welded up. In this case there is a small tube in each heating-tube which conveys the steam up near the top when it comes in contact with the heating-tube passing down along its inner surfaces and condensing as it heats the solution surrounding it. In either case the water of condensation is drawn off from the bottom, and in both cases the concentrated aqua-ammonia is fed into rectifiers above the surface of the liquid, while the weak solution is being blown off from the bottom of the still. The long vertical height is necessary for the purpose of getting the aqueous solution considerably weakened near the bottom, while a saturated solution, or as near as possible to it, will be maintained near the surface for the purpose of getting pure gas. When those systems were employed solely for the purpose of ice-manufacturing and for refrigerating and the materials were confined in sealed vessels and made their rounds continuously in closed circuits, there was no means of ascertaining the degree of purity of the anhydrous ammonia or the density of the solution blown off. Neither was there any means of learning the actual amount of ammonia evaporated to freeze a given quantity of ice or the amount liquefied by the consumption of a given amount of fuel. About all the available information to be obtained from persons in charge of such works was that a certain weight of ice was produced by the consumption of a certain weight of fuel. When I came to use anhydrous ammonia produced with this class of still as a motive power I discovered its great defects. While the vertical column was necessary in order to have the solution weakened near the bottom to blow off, while it was maintained as near as possible to a saturated solution near the surface, it presented the defect of having a small surface area for the escape of the gas while there was a large volume and depth of liquid in which the gas was generated, the result is that aqueous vapors are thrown up with the gas and find their way to the condenser to contaminate the liquid ammonia. It is true that a portion of this aqueous vapor is arrested by the supply of the aqueous solution, which is pumped into the rectifiers, through which the gas has to pass; but it is impossible to get pure anhydrous ammonia by this method except when the stilling is conducted very slowly. While the defect mentioned materially affects the economical operations of ice-factories, refrigerators, &c., when the material is used for portable or detachable powers, the disadvantage or loss of power by the use of an impure gas becomes more apparent. In the ice-factory one gets the benefit of the degree of purity obtained, with the disadvantage only of pumping around larger quantities of liquid; but when this material is used for propelling street-cars, for instance, whenever the pressure of the gas becomes less by throttling in the pipe or chest or expansion in the cylinder, the cooling produced by expansion condenses the watery vapors, and this in turn absorbs gas to saturation, materially affecting the expansive force of the quantity employed for a given amount of work. The result of this defect is that larger quantities of the materials have to be carried to produce a given amount of work or to run a given distance. When this was first discovered, numerous trials were made. The result showed that when the stilling of a charge was accomplished with ordinary rapidity within a given number of minutes the car ran five miles, and when the stilling was conducted more slowly, occupying double the number of minutes, a like charge ran the car double the distance. This was owing to the greater expansive force of the purer gas. Another great defect in the stills heretofore in use for producing the materials for operating ammonia as a motive power was the degree of density of the blow-off. While a solution of aqua-ammonia weighs 26° Baumé (specific gravity 901) at 60° Fahrenheit, and consists of seventy per cent. water to thirty per cent. of ammonia held in solution, the blow-off from the ordinary still has usually a density of about 16° Baumé, (specific gravity 960,) or about twelve per cent. of ammonia. Now as a sufficient quantity of this solution has to be carried on the car to reabsorb the gas after working the engine it is very evident that a larger quantity of this solution is required, which already contains twelve per cent., than if it contained but two or three per cent., and it should not have more. There is also a loss of heat in blowing off the solution at the higher density. While the considerable vertical height is necessary to secure a difference of the degree of density between the supply and the blow-off, extensive evaporating-surface also seems necessary. If, however, the height of the column of liquid is considerable when gas is evaporated in the body of the liquid, it will cast up aqueous vapors. Understanding these difficulties, I conceived the plan of adopting a series of vertical columns of limited vertical height, determined by their area of cross-section and the intensity of the heat to be applied to them, as well as to the varying degree of density of the solution contained in each, all of which are confined within a common inclosure with equal pressure on all surfaces, with divisions in the liquid portion to prevent the commingling of the solutions of different densities and secure increased vertical height in the aggregate, for the purpose mentioned above, all of which is shown and explained in the description and drawings herewith, where the concentrated solution is fed in at the end and circulates down through one column and up through another, becoming gradually increased in density until it reaches the other end of the still, when it is blown off. The horizontal portion of the still is divided by partitions extending above the surface of the liquid between each pair of vertical columns to prevent the mixing of the solution of different densities. The shorter columns are where they contain saturated solution, and where they will be subjected to the most intense heat and where the quickest evaporation will take place, while the columns are longer where the heat is less intense, the solution stronger, and the evaporation takes place more slowly. In designing this class of still I found I could utilize the plainest kind of materials in a very simple form, requiring a limited amount of labor in their construction, and could dispense entirely with the steam-boiler and use in its stead the direct application of the heat of a furnace, thus economizing in first cost of construction and operating while at the same time producing a purer material.

Other advantages of the invention will hereinafter appear, and the novel features thereof will be specifically pointed out in the appended claims.

The invention is clearly illustrated in the accompanying drawings, which, with the letters of reference marked thereon, form a part of this specification, and in which—

Figure 2:
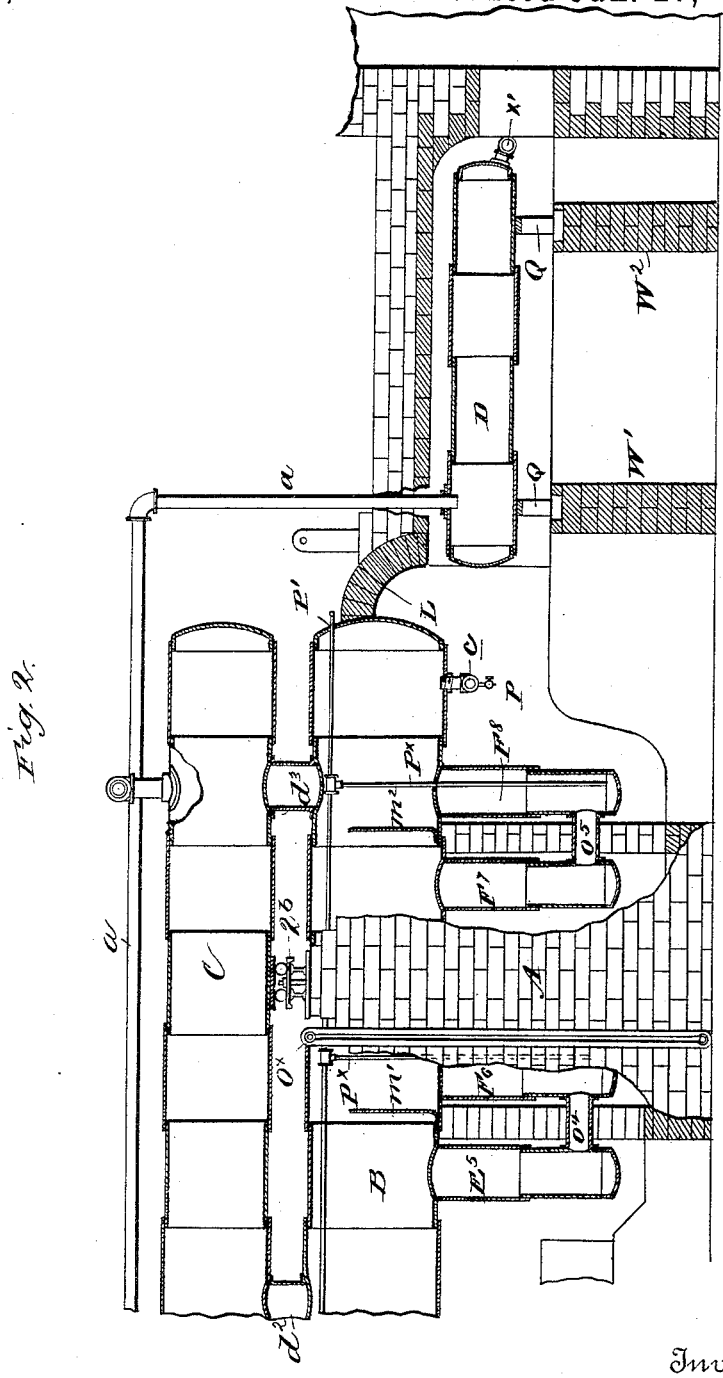
Figure 5:
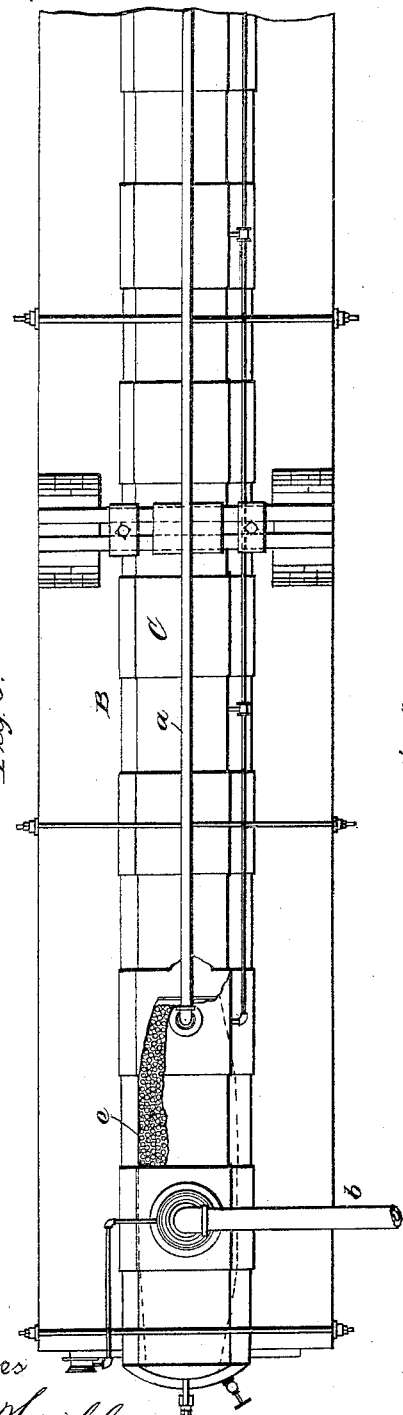
Figure 6:
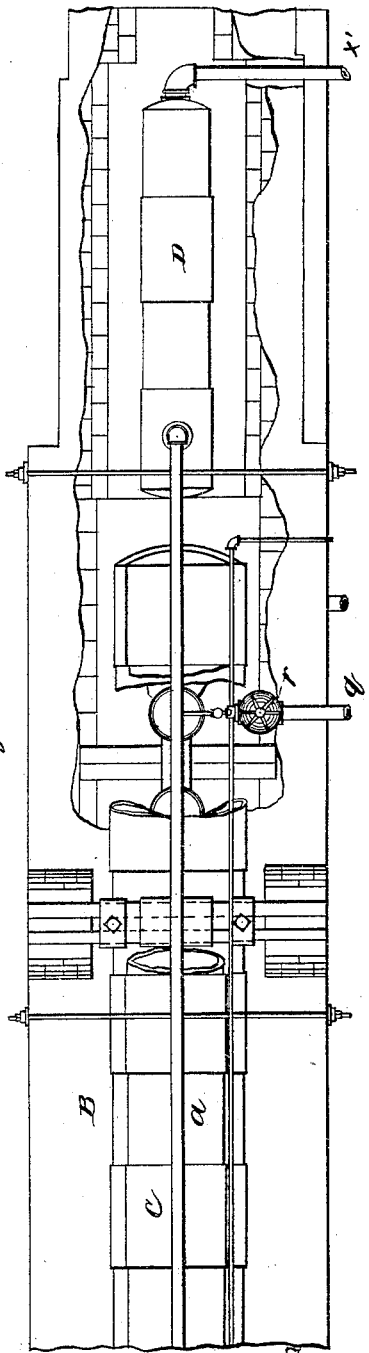

Figures 1 and 2, taken together, represent a vertical longitudinal section through that part of my apparatus called the "still." Fig. 3 is an end elevation, partly in section, of the same. Fig. 4 is a similar view looking from the other end. Figs. 5 and 6, taken together, represent a top plan view of the still with parts broken away. Figs. 7 and 8, taken together, represent a top plan view of the condenser, the tanks, pumps, &c. Fig. 7ᵃ represents an enlarged longitudinal and cross section through one of the condenser-coils and its coupling-sleeve. Fig. 9 is a side elevation with portions broken away, showing the condenser-coils, concentrating-tank, and solution-tank, the same being a side elevation of the parts illustrated in Figs. 7 and 8. Fig. 10 is a detail showing the vacuum-tank and its connections with charging and discharging pipes to motor.

Similar letters of reference indicate like parts in the different figures.

A represents the setting or brick-work of still; B, the horizontal portion of still; C, the gas-chamber; D, the heater or economizer; E, the bridge-wall of furnace; $W'$ $W^2$, walls supporting saddles Q Q and heater D; $F'$ $F^2$ $F^3$, &c., the vertical portions of still; G, the front; H, the grate-bars; I, ash-pit; J, combustion-chamber; K, furnace-door; L, arch in rear wall for escape of heated products of combustion to heater and uptake; $G^2$, pressure-gage connected to gas-chamber J, and $O'$ $O^2$ $O^3$, &c., connections between each pair of legs or vertical columns.

$a$ is the supply-pipe to feed the still with the strong solution from the heater D.

$b$ is the gas-pipe from gas-chamber to condenser.

$c$ is the blow-off for the weak solution; $d'$ $d^2$ $d^3$, &c., legs of gas-chamber; $e$, perforated scattering-plate in the gas-chamber C; $j$, aqua-ammonia gage on still B; $l'$ $l'$ $l^2$ and $m$ $m'$ $m^2$, division-plates or partitions in horizontal portions of still; $n$, partition in gas-chamber; $p$, pipe for drawing off samples from blow-off to test density; $q$, pressure-pipe from gas-chamber to supply gas to drive-pumps, and $1^x 2^x$, &c., side brackets held in pairs by bolts across the furnace-wall.

$1^b 2^b$, &c. are I-beams resting on the wall A A to support the still by means of rollers and hooks, as shown.

$p'$ is a siphon-pipe having branches $p^x$ extending down into the legs of the vertical columns F, &c., Figs. 1 and 2; $O^x$, manifold of condenser; P, condenser-coils, and R circulating-pump; S, supply or feed pump to still.

T, Fig. 7, is the pump for charging weak solution to motor from tank; W U, pump for withdrawing strong solution from motor through the vacuum-tank $V^8$ and pumping it into the bottom tank V through the concentrator X, Fig. 8, and pipe Y.

V V' $V^2$ are the strong-solution tanks.

W $W^3$ $W^4$ are the weak-solution tanks.

X is a concentrating-tank.

Y is the pipe from the concentrator to the strong-solution tank V, and O b brick walls supporting the condenser-coils P P' $P^2$ and sprinklers O' $O^2$ $O^3$.

F' is a wooden drip-trough, with a draining-pipe leading to a sewer to receive the condensing water as it drips from the coils. Said trough is built on five-by-eight sills on top of brick walls, as shown at $B^3$ in Fig. 9, with joists placed as is usual.

$7^a$ represents an enlarged view of one of the joints in the condenser-coils, every fifth or sixth coil being connected by a right and left hand sleeve-coupling, as shown at $V^6$.

$H^2$ $H^2$ are coil-stands resting in cast-iron plates on the bottom of the trough F'; M, anhydrous-ammonia receiver; N, charging-receiver, and $f$ connecting-pipe between receivers M and N.

In Fig. 10, $g$ is the charging-pipe to motor; $h$, valve in connecting-pipe; $i$, valve in charging-pipe; $j$, gage on charging-receiver; $r$, valve in pressure-pipe. In Fig. 8, $s$ is the pressure-pipe to feed-pump; $s'$, exhaust from feed-pump to concentrator; $t$, pressure-pipe to drive circulating-pump R, and $t'$ exhaust-pipe from circulating-pump R to concentrator X.

$u$ is a pressure-pipe to pump for charging motor with weak solution; $u'$, exhaust from this pump to concentrator; $v$, pressure-pipe to pump for pumping solutions from one motor to strong-solution tank through concentrator X, and $v'$ exhaust from this pump to concentrator X.

$x^2$ represents the suction-pipe to feed-pump from strong-solution tank V, and $x'$ discharge to heater D.

$y$ represents suction-pipe to circulating-pump; and $y'$ is the discharge-pipe from the circulating-pump R to the perforated pipes O, O'', and $O^2$ over the condenser.

$y''$ is the branch of the discharge-pipe $y'$ to the concentrator X.

$z$ represents the suction from weak-solution tank W to pump for charging motor, and $z'$ represents discharge-pipe to motor.

$z^2$ represents suction-pipe from motor through vacuum-tank $V^8$, as indicated by the arrow; $z^3$, suction-pipe to strong-solution pump U, and $z^4$ the discharge from this pump through concentrator X to strong-solution tank V.

The operation is as follows: Concentrated aqua-ammonia from the tank V, Figs. 7 and 8, is fed continuously by the pump S into the still through the heater D and pipe $a$ onto the perforated plate, where it showers down through the perforations into the bottom of the gas-chamber C, and thence through the leg $d$ into the front end of the horizontal portion of the still B. The heat from the furnace liberates a portion of the gas from the solution contained between the partition $l$ and the front end of still, thus reducing the strength of the solution before it reaches that portion comprised between the partitions $l$ and $l'$, when it is still further reduced in strength before it passes to the next division, and so on to the end of the still, where it is greatly weakened and is blown off through the pipe $c$ to the weak-solution tank W $W^3$ $W^4$, Fig. 9. The gas-space is common to all the divisions formed by the partition, and as the gas is expelled from the solution it passes off through the chamber J and pipe $b$, Figs. 3 and 5, to the condenser P P' $P^2$. The apparatus is worked continuously, the quantity of gas liberated and the amount of weak solution blown off being together equal to the amount fed in by the supply-pump S, the solution becoming weaker as it reaches the blow-off end. The partitions $l$ $l'$ $l^2$ $m$ $m'$ $m^2$ prevent the commingling of the strong with the weaker solution, so that it may be reduced in its passage from the front to the rear of the still. The arrangement of still allows a great aggregate vertical height in its passage through the vertical columns, while at the same time the horizontal portion affords ample evaporating-surface. The gas on its passage through the still to the condenser P comes in contact with the incoming solution on its passage through the perforations in the plate $e$, where aqueous vapors carried up by the escaping gas become condensed and fall back with the solution, while the heat thus given out liberates a portion of the ammonia in the incoming solution into a gas which escapes, along with that liberated in the still, to the condenser P. The condenser P is cooled by the water being continuously sprayed over the coils by the circulating-pump R. This water takes the heat from the gas through the metallic surface of the pipe by its evaporation, and the gas is liquefied under its own pressure, and runs off into the storage receiver or tank M. Portions are let into the charging-tank N from time to time, as required for the purpose of measuring and observing the quantity of the charge by means of the gage $j$. From this receiver charges are taken for the receiver of a motor, or for other purposes, through the pipe $g$ and valve $i$, Fig. 7, and the weak solution to absorb such charge is taken from the weak-solution tank W by means of the pump T, through the suction-pipe $z$, and forced into the absorbing tank or motor, or for other purposes, as the case may be. When the charge has become expended, that which was charged in as a weak solution will now be a strong solution, the charge of ammonia having been absorbed by it. It is now withdrawn through the pipe $z^2$ into the vacuum-tank $V^8$ by means of the pump U, a pipe $z^3$, and pumped into the strong-solution tank V through the concentrator X.

The manner of charging and of withdrawing the charge is more fully shown and described in my application, Serial No. 244,492, filed July 16, 1887.

Referring to Fig. 7, at the left thereof I have indicated in dotted lines a portion of a motor or car or other device to which the pipes $g^4$ and $g^5$ are attached, each of which is provided with a suitable cock or valve of any suitable construction. $g^6$ is a pipe, which is practically a continuation of the pipes $z'$ and $z^2$ from their point of junction. This pipe $g^6$ serves both for charging in the weak solution to the motor and also for withdrawing the concentrated solution after the charge is exhausted. The pipe $g^4$ is connected with that portion of the apparatus on the motor or car to contain the anhydrous ammonia delivered through the pipe $g$ and valve $i$ from the receiver N. The pipe $g^5$ is connected with that portion of the apparatus on the car or motor for receiving the weak solution to absorb the gas from the engine while working.

In order to charge the car or motor, the pipes $g$ and $g^4$ are coupled together for charging the anhydrous ammonia, and the pipes $g^5$ $g^6$ for charging the weak solution. This coupling may be accomplished in any well-known manner. When the charge of anhydrous ammonia has been put in, the valves $i$ and $i^2$ are closed, and the anhydrous ammonia remaining between those two valves is withdrawn into the vacuum-tank $V^8$ through the pipe $g^7$, which communicates with the vacuum-tank $V^8$, either direct or through any suitable intermediate connection. That shown in Fig. 7 is but one of the various ways in which it might be accomplished. The vacuum is thus produced or obtained between the valves $i$ and $i^2$ before uncoupling, so that there is no loss of the material between these two valves. Both of the pipes $g^5$ and $g^6$ are provided with valves $g^8$ and $g^9$, respectively, the two pipes being coupled together for the pupose of charging the weak solution into the apparatus on the car or motor for absorbing the gas, the same pipes and valves being also used for withdrawing the concentrated solution after the charge has been expended into the tank $V^8$, leaving a vacuum in said pipes before uncoupling, also avoiding any escape or loss of material at this point.

It is evident that the arrangement of furnace and heater may be varied and the latter sometimes omitted without affecting the operation or advantages of the other features.

What I claim as new is—

1. In a device for the purpose described, a horizontal still provided with depending legs in descending series, substantially as specified.

2. In a device for the purpose described, a horizontal still provided with depending legs arranged in pairs in descending series, substantilly as described.

3. In a device for the purpose described, a horizontal still provided with depending legs in pairs in descending series, the legs of each pair being connected by a transverse passage, substantially as described.

4. In a device for the purpose described, a horizontal still provided with depending legs in pairs, the legs of each pair having communication with each other and the pairs arranged in descending series with the shortest legs nearest the source of heat, substantially as described.

5. In a device for the purpose described, a horizontal still provided with depending legs in pairs, and with a partition within the horizontal portion of the still between the legs of each pair, as set forth.

6. In a device for the purpose described, a horizontal still provided with depending legs in pairs, with a communication between the legs of each pair, and a vertical partition within the horizontal portion between the legs of each pair, substantially as described.

7. In a device for the purpose described, a horizontal still having depending legs, combined with a draw-off pipe having branches extending into said legs, as set forth.

8. In a device for the purpose described, a horizontal still having depending legs with communication between each two legs forming a pair, and a vertical partition within the horizontal portion of the still, between the legs of each pair, combined with a draw-off pipe having depending branches extending into one of the legs of each pair, as set forth.

9. In a device for the purpose described, the combination, with the horizontal still, of a gas-chamber above the same and having communication with the horizontal portion, a supply-pipe to the gas-chamber, and a perforated plate within the gas-chamber, beneath the discharge end of the supply-pipe, as set forth.

10. The combination, with the horizontal still, of the gas-chamber parallel with and communicating with the same, a supply-pipe to said gas-chamber, a perforated plate within the gas-chamber, beneath the discharge end of the supply-pipe, and a vertical partition within the gas-chamber in proximity to the perforated plate, as and for the purpose specified.

11. The combination, with the horizontal still and the gas-chamber communicating therewith, of the heater D, and a supply-pipe leading from said heater to the gas-chamber, as set forth.

12. The combination, with the horizontal still and the gas-chamber communicating therewith and having a perforated plate, of the vertical partition within the gas-chamber in proximity to said plate, the heater D, and the supply-pipe from said heater to the gas-chamber discharging above said plate, as set forth.

13. The combination, with the horizontal still, of the gas-chamber C communicating therewith, the vertical gas-chamber at one end of said chamber C, the condenser, and the pipe leading from the vertical gas-chamber to said condenser, as set forth.

14. The combination, with the horizontal still, the horizontal gas-chamber communicating therewith, and the vertical gas-chamber at one end of the horizontal gas-chamber, of the heater D, the pipe leading from the heater to the horizontal gas-chamber, the condenser, and the pipe leading from the vertical gas-chamber to the said condenser, as set forth.

15. The combination, with the horizontal still, the horizontal gas-chamber communicating therewith, the vertical gas-chamber at one end of the horizontal gas-chamber, the heater, and the pipe leading therefrom to the horizontal gas-chamber, of the condenser, the pipe leading from the vertical gas-chamber to the condenser, and a connection between said condenser and the storage-tank, as set forth.

16. The combination, with the horizontal still and the condenser connected therewith, of the storage-tank connected with the condenser, the charging tank connected with the storage-tank, and a valve-controlled outlet from the charging-tank, as set forth.

17. The combination, with the horizontal still and the condenser connected therewith, of the storage-tank connected with the condenser, the charging-tank connected with the storage-tank, a valve-outlet to the charging-tank, and a pump or tube adapted to produce a vacuum between the valves, substantially as and for the purpose specified.

18. The combination, with the strong-solution tanks and the concentrator connected therewith, of the weak-solution tanks, the vacuum-tank, and connections, substantially as described, between said parts, as set forth.

19. The combination, with the strong-solution tanks, the concentrator, and the weak-solution tanks, of the vacuum-tank, the various pumps, and their connections with the above-mentioned parts, substantially as and for the purpose specified.

20. The combination, with the strong and weak solution tanks and a concentrator connected with the strong-solution tanks, of the condenser, the various pumps, and connections between the pumps, condenser, and concentrator, as set forth.

21. The combination, with the still, the strong and weak solution tanks, and the concentrator connected with the strong-solution tanks, of the condenser, the pumps, and connections, substantially as described, between the concentrator, still, condenser, and tanks, as set forth.

22. The combination, with the condensing-coils and the circulating-pumps, of the perforated distributing-pipes arranged above said coils and having connection with the pumps, substantially as described.

In testimony whereof I affix my signature in presence of two witnesses.

PATRICK JAY McMAHON.

Witnesses:
L. C. HILLS,
H. SUTHERLAND.